Dec. 13, 1960  C. R. VAN DINE  2,964,307
SEALING MEANS
Filed Nov. 15, 1956
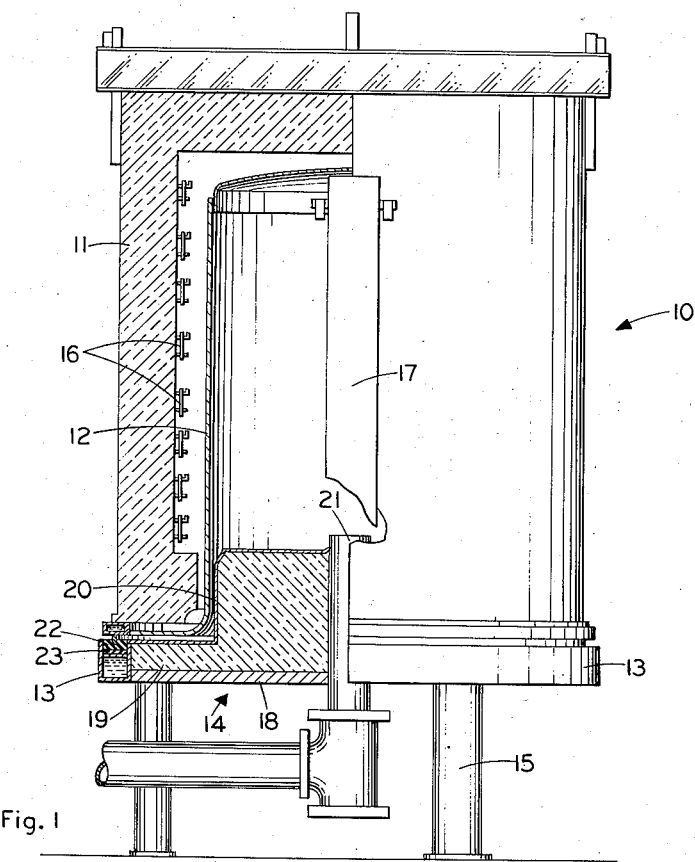
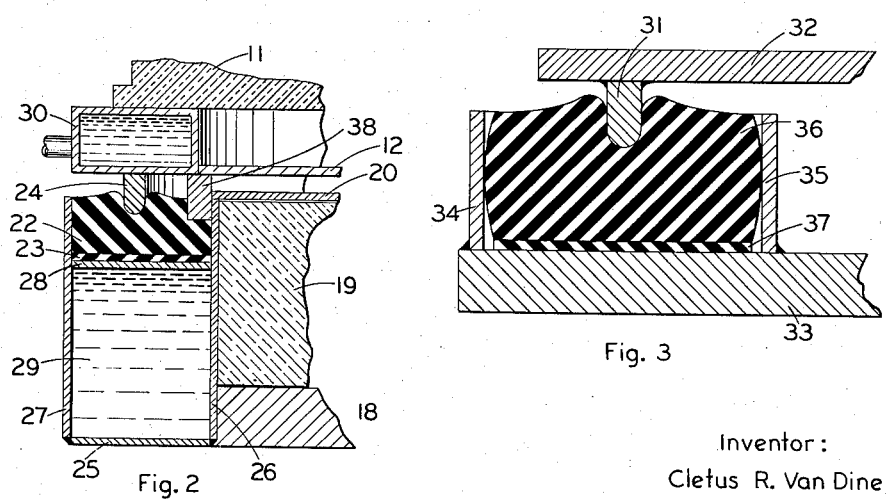
Fig. 1
Fig. 2
Fig. 3
Inventor:
Cletus R. Van Dine
by Richard E. Hosley
His Attorney

United States Patent Office 2,964,307
Patented Dec. 13, 1960

2,964,307
SEALING MEANS

Cletus R. Van Dine, Shelbyville, Ind., assignor to General Electric Company, a corporation of New York Filed Nov. 15, 1956, Ser. No. 622,472

3 Claims. (Cl. 263—40)

My invention relates to sealing means and particularly to static sealing means capable of providing an atmospheric seal and having particular utility in furnace apparatus.

Heretofore, efficient atmospheric sealing of separable members operable to permit access to an evacuable chamber may have been achieved only at great expense due to the need for machining precise surfaces to render sealing efficiently effective. Where the need for atmospheric sealing is met in large apparatus, such as bell type furnaces, the requirement of precise machining tends to make costs prohibitive and thereby imposes a limitation on the size and consequently the capacity of the apparatus. Furthermore as the size of the apparatus and its operable members increases serious limitations are placed on the use of resilient materials capable of performing a sealing function and at the same time sustaining pressures imposed thereon.

It is therefore an object of my invention to provide an improved sealing means which dispenses with the need for precision machined parts and makes possible the use of conventional rolled plate or like material while obtaining an efficient atmospheric seal.

It is also an object of my invention to provide an improved sealing means capable of performing at atmospheric sealing function and at the same time withstanding high stresses imposed in large apparatus.

It is a further object to achieve the above objects in a furnace apparatus.

In accordance with the above objects, I practice my invention in connection with an evacuable chamber having relatively movable separable members operable to permit access to the inner realm of the chamber. Atmospheric sealing between the members is provided by a resilient means placed within a groove means on one of said members and being subjected to pressure from a sealing blade member on the other member and having an edge insertable into the confines of the groove means. The resilient means is composed of two superposed layers of rubberlike material one layer of which engages the blade member to yield under pressure therefrom to form an atmospheric seal by surface contact therewith, and the other layer of which yields to pressure imposed by said upper layer to form atmospheric sealing with the groove means. To accomplish effective atmospheric sealing the layers are of different hardness characteristics and are capable therefore of being displaced different amounts when pressure is applied to the first of the layers. More particularly it is desired that the first layer be of a hardness greater than the second layer so that the differences result in different amounts of displacement to effectuate sealing between the edge of the blade member, the layers, and the groove means of the second layer thereby forming an atmospheric seal between the first and second separable members of the evacuation chamber. In a preferred embodiment, the apparatus is a furnace and the evacuable chamber is formed by a retort and cover plate member adapted to have sealing blade and groove means between which the two layer resilient means of different hardness characteristics is pressed.

It will be appreciated that the sealing means of my invention provides a highly efficient atmospheric seal capable of withstanding extensive pressure and without requiring specially machined surfaces in the groove means, blade members, or separable members.

The features of this invention which are believed to be novel are set forth with particularity in the appended claims. The invention itself may be better understood as to organization and construction as well as to further objects and advantages by reference to the following description taken in conjunction with the accompanying drawings in which:

Fig. 1 is a front view of a furnace having a quarter section in which a specific embodiment of my invention is illustrated.

Fig. 2 is an enlarged fragmentary sectional view taken from Fig. 1 to illustrate more clearly the details of the sealing means structure.

Fig. 3 is a sectional view in fragment of a structure showing in enlargement further explanatory details of my invention in its broader concept not necessarily in a furnace of the type disclosed in Figs. 1 and 2.

Referring to the drawing there is shown in Figure 1 an embodiment of a furnace 10 of the type generally referred to as the bell type, and in which my invention is of particular utility, comprising a cylindrical furnace insulation cover 11 and a cylindrical retort 12 supportably and removably mounted in concentric array on a base cover generally designated as 14. While base cover 14 may take various constructions it is preferably a composite structure comprised of a circular metallic base plate 18 over which is placed a refractory member 19 and around which is attached an annular channel member or groove means 13. Rigidity of the composite structure is obtained preferably by welding channel member 13 to the peripheral edge of circular baseplate 18. The entire furnace structure may be supported above floor level by suitable supports 15 of any well known type. Heating within the furnace is preferably obtained by electric heating elements 16 mounted on the internal surface of the furnace insulation 11 by well known means. Energization of the heating elements 16 may be effectuated by energy from an external power source (not shown) which is connected to suitable terminal means 17 mounted externally of the furnace insulation to which the heating elements are connected in a suitable manner. To permit attainment of a suitable vacuum by preventing degassing of the refractory member 19, a metallic cover 20 is placed over the refractory material. Attachment is made at the radial extremity of the metal cover 20 preferably by welding to inner surface of annular channel member 13.

It is intended that evacuation be obtained between retort 12 and the cover plate member 14. For that purpose a conduit 21 is introduced through base plate 18, refractory member 19 and metallic cover 20. Connection is then made from conduit 21 to suitable pumping apparatus not shown whereupon air under the retort 12 may be withdrawn following mounting of retort 12 on the cover plate member 14. To attain an adequate vacuum resilient means having superposed layers 22 and 23 is provided which can be subjected to pressure to thereby form an atmospheric seal between retort 12 and cover plate member 14. To this end the retort 12 having skirted ends is provided with an annular sealing blade member 24, whereas annular member 13 is designed to function as a retaining groove means. While the annular member 13 may be constructed in any form, it is preferably fabricated from a number of flat plates 25, 26, 27, and 28, welded together to form a composite structure having an open channel in which the resilient means is placed and a closed conduit 29 through which cooling fluid is to flow in accordance with any well known and suitable practice (see Figure 2). In this composite structure, plate 28 separates the groove retaining portion from the conduit numeral 29 and thereby provides a base for the resilient means 22. To prevent overheating of the resilient means 22, blade member may be cooled by a conduit 30 rigidly connected suitably to the end of the skirt of retort 12 as best seen in Fig. 2. Additionally, conduit 30 may serve as a base for the furnace insulation cover 11.

In the operation of the device of Figure 1, the furnace insulation 11 and retort 12 are separately removable from the cover plate member 14 to permit access to the chamber formed thereby. Prior to processing, a material is placed on the metal cover 20 whereupon the retort 12 and then the furnace insulation 11 are placed over the cover plate member 14. In being so positioned, the sealing blade member 24 is brought to bear on layer 22 of resilient means in the open retaining groove of annular member 13. As is shown in Figs. 1 and 2, the resilient means, when the retort is assembled on the plate member 14, supports at least a portion of the weight of the retort and insulation, and thus the resilient means is subjected to an extensive pressure and is displaceable from its unstressed condition. This arrangement is advantageous since it permits quick assembly and mounting; however, the use of a sealing blade member subjects the resilient means to high stress reasonably preventing the use of a single resilient means capable of sustaining the high stress and at the same time being sufficiently displaceable by said stress to form the necessary atmospheric seal without requiring machined supports for the resilient means. To avoid the necessity of machining the surface of plate 28 of annular member 13 as best seen in Fig. 2, I provide a resilient means having two layers 22 and 23 of rubberlike material having different hardness characteristic so as to be displaceable under pressure from sealing blade member 24 different amounts. Referring to Fig. 3 the invention is further described in its broader concept where sealing blade member 31 is attached to a member 32 which is a fragment of a first member adapted to form a part of an evacuable chamber with a second member represented in fragmentary form by numeral 33. Groove retaining means is provided by seal retainers 34 and 35 which may be flat plates welded along their edges to member 33 which is preferably unmachined along the surface between the retainers. Thus irregularities formed in that surface during fabrication may tend to defeat atmospheric sealing, especially where resilient means would be of sufficient hardness to resist pressure imposed by blade member 31 and not displace in accordance with surface irregularities. Referring to Fig. 3, it will be further seen that the resilient means comprises layers 36 and 37. Both layers are of different hardness characteristics such as to be displaceable different amounts. Layer 36 is intended to have a hardness characteristic such that while yielding to pressure from sealing blade member 31 thereby forming an atmospheric seal therewith, it must also resist deformation sufficiently to distribute pressure substantially over the entire upper surface of layer 37. This lower layer 37 is then selected to be of a hardness characteristic less than that of layer 36 so as to be capable of being displaceable along the entire surface of member 33 with which it may be in contact. While a number of ranges of hardness characteristic may be selected to achieve the results of my invention for a particular design, it has been found that a particular application where pressure on layer 36 was 175–200 p.s.i. that a rubberlike material of 60 to 80 durometer hardness for layer 36 while a rubberlike material of 10 to 20 durometer hardness for layer 37 achieved an efficient atmospheric seal. It is further to be noted that no adhesive cementing was necessary between layers 36 and 37. Within the scope of this invention, the hardness characteristic of layer 37 whereby an atmospheric seal is formed with base of the groove means will also form an atmospheric seal along the interface between the layers 36 and 37. While Fig. 3 shows a particular deformation of layer 36, it is not intended to be critical in this regard. The deformation shown is illustrative to show recognition of displacement of the layers by sealing blade members 24 and 31. The amount of deformation and its specific contour may be largely unpredictable and may differ from one material to another while still being capable of fulfilling the purpose and objects of the invention. A certain limit may possibly be placed on the deformation to prevent shearing by providing stop blocks 38 as in Fig. 2. The showing of bulging of layer 36 in Fig. 3 to an extent that it touches the sides of retainers 34 and 35 is not intended to be a limitation on the invention since adequate sealing is obtained along the surfaces of the edge of the blade member 31, the base groove means on member 33, and between the layers if no adhesive cementing is utilized.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a vessel such as a bell type furnace having an evacuable chamber and a pair of adjoining separable members at least in part forming the evacuable chamber, atmospheric sealing means between said adjoining members including a base member fixed to one of said adjoining members and having a substantially unmachined surface, and spaced walls extending from said unmachined surface to define a channel therewith, a blade member fixed to the other member of said pair of adjoining members and extending into said channel and terminating short of said unmachined surface of said base member when said separable members are closely adjacent to form said evacuable chamber, a resilient means positioned on said unmachined surface and retained by the said walls, said resilient means comprising a first layer of a resilient rubber-like sealing material engaged on said unmachined surface and a second layer of a resilient rubber-like sealing material supported on the first layer in sealed engagement and sealingly and penetratingly engaged by the blade member, said first layer being relatively soft as compared to said second layer, said second layer supporting at least a portion of the weight of said other member through engagement thereby by said blade member and being substantially harder than said first layer to resist permanent deformation by said blade member and to impose a pressure on the first layer to deform the material of the first layer into the imperfections of said unmachined surface thereby providing an atmospheric seal with said unmachined surface.

2. In a bell-type furnace and the like having an evacuable chamber formed by a horizontally disposed base and a vertically extending retort having an open bottom and supported on the base, the base having an upwardly facing substantially unmachined surface, and spaced walls extending upwardly from said unmachined surface to define an upwardly extending channel therewith, a resilient means positioned on said unmachined surface and retained by the said walls, said resilient means comprising a first horizontally disposed layer of a resilient rubber-like sealing material positioned on said unmachined surface, a second layer of a resilient rubber-like sealing material positioned on said first layer on a portion thereof generally opposite said base, and a depending blade on the retort sealingly engaging said second layer in penetrating fashion, said second layer at least partially supporting the weight of the retort and being substantially harder than said first layer and sufficiently hard to resist permanent deformation thereof by said blade and to impose a pressure on the first layer to deform the material of the first layer into the imperfections of said unmachined surface thereby providing an atmospheric seal with said unmachined surface.

3. In a bell-type furnace and the like having an evacuable charge receivable chamber formed by a horizontally disposed base and a vertically arranged retort having an open bottom adapted to be supported on the base, means to provide an atmospheric seal between the base and retort about the periphery of the same comprising an upwardly facing substantially unmachined bottom surface and spaced walls extending upwardly from said unmachined surface to define an upwardly opening annular channel member on the base, an annular blade member depending from the retort in registry with and at least partially extending into said channel member at substantially right angles to said bottom surface, a resilient means positioned on the said unmachined surface and retained in a radial direction by the walls of the said channel member, said resilient means comprising a first layer of a resilient rubber-like sealing material resting on said bottom surface, and a second layer of a resilient rubber-like sealing material positioned on said first layer, said blade member being engaged with said second layer in penetrating sealed relation, said second layer being in the order of 3–8 times as hard as said first layer and being sufficiently hard to support at least a portion of the weight of said retort by reason of the engagement of the blade member with said second layer and to resist permanent deformation by said blade member, and to impose a pressure on said first layer to deform the material of the first layer into the imperfections of said unmachined surface thereby providing an atmospheric seal.

References Cited in the file of this patent

UNITED STATES PATENTS

| | | |
|---|---|---|
| 1,938,306 | Webb | Dec. 5, 1933 |
| 2,028,106 | Otis | Jan. 14, 1936 |
| 2,074,662 | McLay | Mar. 23, 1937 |
| 2,144,082 | Randall | Jan. 17, 1939 |
| 2,480,293 | Hulme | Aug. 30, 1949 |
| 2,558,088 | Hoop | June 26, 1951 |

OTHER REFERENCES

Vanderbilt Rubber Handbook, R. T. Vanderbilt Co., New York, pages, 212, 213, 448 to 454.